(12) United States Patent
Karunakaran et al.

(10) Patent No.: US 8,927,677 B2
(45) Date of Patent: Jan. 6, 2015

(54) TOUGHENING AGENT FOR EPOXY RESIN COMPOSITIONS

(75) Inventors: Radhakrishnan Karunakaran, Lake Jackson, TX (US); Rajesh Turakhia, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 184 days.

(21) Appl. No.: 13/636,282

(22) PCT Filed: Mar. 22, 2011

(86) PCT No.: PCT/US2011/000522
§ 371 (c)(1),
(2), (4) Date: Oct. 3, 2012

(87) PCT Pub. No.: WO2011/119216
PCT Pub. Date: Sep. 29, 2011

(65) Prior Publication Data
US 2013/0131217 A1    May 23, 2013

Related U.S. Application Data

(60) Provisional application No. 61/316,962, filed on Mar. 24, 2010.

(51) Int. Cl.
| | | |
|---|---|---|
| *B32B 27/38* | (2006.01) | |
| *C08G 59/42* | (2006.01) | |
| *C08G 59/50* | (2006.01) | |
| *C08G 61/10* | (2006.01) | |
| *C08G 61/12* | (2006.01) | |
| *C08L 25/04* | (2006.01) | |
| *C08L 63/00* | (2006.01) | |
| *C08L 63/02* | (2006.01) | |
| *C08L 63/04* | (2006.01) | |
| *C08K 5/06* | (2006.01) | |
| *C08L 71/02* | (2006.01) | |

(52) U.S. Cl.
CPC . *C08K 5/06* (2013.01); *C08G 59/42* (2013.01); *C08L 63/00* (2013.01); *C08L 71/02* (2013.01)
USPC .......... 528/112; 438/413; 525/117; 525/438; 525/481; 525/510; 525/523; 525/530; 525/533; 528/107; 528/121

(58) Field of Classification Search
None
See application file for complete search history.

(56) References Cited

U.S. PATENT DOCUMENTS

| | | |
|---|---|---|
| 3,018,262 A | 1/1962 | Schroeder |
| 4,113,541 A | 9/1978 | Turley et al. |
| 4,497,945 A | 2/1985 | Salloum et al. |
| 5,405,688 A | 4/1995 | Decker et al. |
| 6,153,719 A | 11/2000 | Abbey et al. |
| 6,242,083 B1 | 6/2001 | McGrail et al. |
| 6,572,971 B2 | 6/2003 | Martin |
| 6,613,839 B1 | 9/2003 | Gan et al. |
| 6,632,893 B2 | 10/2003 | Konarski et al. |
| 6,887,574 B2 | 5/2005 | Dean et al. |
| 7,037,958 B1 | 5/2006 | Hansen et al. |
| 7,163,973 B2 | 1/2007 | Ahsan |
| 2005/0171237 A1 | 8/2005 | Patel et al. |
| 2006/0293172 A1 | 12/2006 | Rubinsztajn et al. |
| 2011/0293891 A1* | 12/2011 | Leyden et al. ............. 428/172 |

FOREIGN PATENT DOCUMENTS

| | | | |
|---|---|---|---|
| JP | 56-28253 A | * | 3/1981 |
| JP | 5628253 | | 3/1981 |
| JP | 2006-63135 A | * | 3/2006 |
| WO | 97/31965 | | 9/1997 |
| WO | 2006052727 | | 5/2006 |
| WO | WO 2007031505 A1 | * | 3/2007 |
| WO | 2010121392 | | 10/2010 |

OTHER PUBLICATIONS

International Search Report and Written Opinion from related PCT application PCT/US2011/000522 dated Nov. 15, 2011, 11 pages.
International Preliminary Report on Patentability from related PCT application PCT/US2011/000522 dated Apr. 30, 2012, 9 pages.
Lee, et al. "Handbook of Epoxy Resins", McGraw-Hill Book Company, New York, 1967, Chapter 2, 2-1 to 2-33.

* cited by examiner

*Primary Examiner* — Robert Sellers
(74) *Attorney, Agent, or Firm* — Brooks, Cameron & Huebsch, PLLC

(57) ABSTRACT

A curable epoxy resin composition comprising (a) at least one epoxy resin; (b) at least one curing agent; and (c) at least one high molecular weight poly(propylene oxide) poiyol toughening agent; and a process for preparing the curable epoxy resin composition.

15 Claims, 1 Drawing Sheet

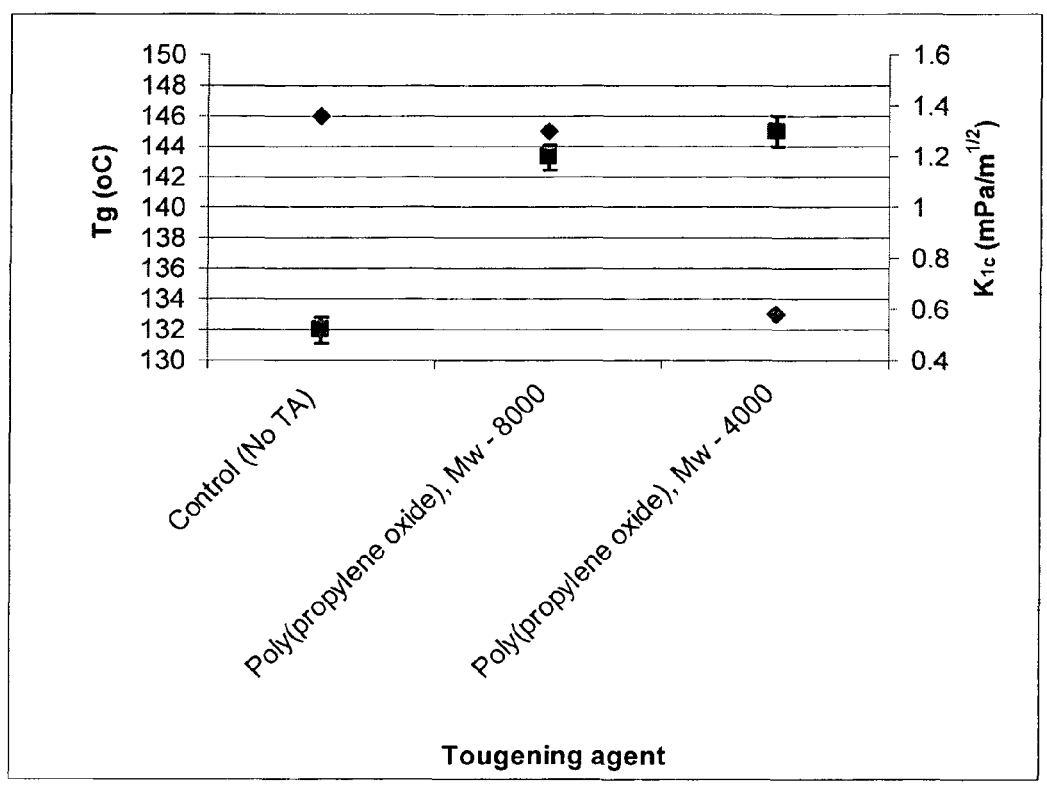

US 8,927,677 B2

TOUGHENING AGENT FOR EPOXY RESIN COMPOSITIONS

This application is a National Stage application under 35 U.S.C. 371 of PCT/US2011/000522, filed on Mar. 22, 2011 and published as WO2011/119216 A2 on Sep. 29, 2011, which claims the benefit of U.S. Provisional Application Ser. No. 61/316,962 filed Mar. 24, 2010, the entire contents of which are incorporated herein by reference in its entirety.

BACKGROUND OF THE INVENTION

1. Field of the Invention

The present invention is related to a toughening agent for an epoxy resin composition; and more specifically, the present invention is related to a high molecular weight poly (propylene oxide) polyol toughening agent for use in epoxy resin compositions.

2. Description of Background and Related Art

There are various known methods for toughening epoxy thermosets using a number of available known toughening agents such as for example using core-shell rubbers as toughening agents. In another example, U.S. Pat. No. 4,497,945 discloses the use of a low molecular weight (1000-3000 daltons) poly(propylene oxide) diol or triol as a toughening agent for epoxy-anhydride thermosets. The low molecular weight polyol known in the above prior art has the disadvantage of decreasing the glass transition temperature (Tg) of the resulting thermoset system.

It is therefore desired to provide a curable epoxy resin system with a toughening agent that will (1) improve the toughness of the epoxy resin system without decreasing or detrimentally affecting the Tg of the final thermoset made from the epoxy resin system; and (2) not detrimentally affect the properties of the final thermoset system.

SUMMARY OF THE INVENTION

The present invention is directed to the use of a high molecular weight polyol such as poly(propylene oxide) polyol as a toughening agent for toughening an epoxy resin composition such as an epoxy-anhydride system without compromising some of the mechanical and thermal properties of the thermoset such Tg.

Advantageously, the use of high molecular weight poly (propylene oxide) polyol in a curable epoxide resin system provides a thermoset product with an improved toughness without sacrificing final Tg of the resulting thermoset system.

One embodiment of the present invention is directed to a curable resin composition or system (or formulation) including (a) at least one epoxy resin; (b) at least one curing agent; and (c) at least one high molecular weight poly(propylene oxide) polyol toughening agent; wherein the number average molecular weight of the toughening agent is greater than about 7000.

One advantage of using the toughening agent of the present invention includes for example, wherein the toughening agent provides an epoxy resin composition which exhibits no change in Tg; wherein the range of the Tg may be from 70° C. to 265° C. Also, the toughening agent of the present invention has a lower viscosity as compared to commercial toughening agents like carboxylic acid terminated butadiene-acrylonitrile copolymer (CTBN).

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

FIG. 1 is a graphical illustration showing the molecular weight versus the Tg of a thermoset when the toughening agent of Example 1, of the Control and of the Comparative Example A is used.

DETAILED DESCRIPTION OF THE INVENTION

One broad aspect of the present invention comprises a curable epoxy resin composition, system or formulation comprising (a) at least one epoxy resin; (b) at least one curing agent; and (c) at least one high molecular weight poly(propylene oxide) polyol toughening agent and (d) optionally at least one catalyst.

By "high molecular weight (MW)" with reference to the composition of the present invention herein, it is meant a number average MW of greater than about 7,000. For example, in one embodiment, the MW of the composition of the present invention may be from about 7,000 to about 20,000.

The present invention curable composition includes at least one epoxy resin, component (a). Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins, used in embodiments disclosed herein for component (a) of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

The epoxy resins, component (a), useful in the present invention for the preparation of the curable compositions, may be selected from commercially available products. For example, D.E.R®. 331, D.E.R. 332, D.E.R. 334, D.E.R. 580, D.E.N. 431, D.E.N. 438, D.E.R. 736, or D.E.R. 732 available from The Dow Chemical Company may be used. As an illustration of the present invention, the epoxy resin component (a) may be a liquid epoxy resin, such as D.E.R. 383 which is a diglycidylether of bisphenol A (DGEBPA), having an epoxide equivalent weight of 175-185, a viscosity of 9.5 Pa-s and a density of 1.16 grams/cc. Other commercial epoxy resins that can be used for the epoxy resin component can be D.E.R. 330, D.E.R. 354, or D.E.R. 332.

Other suitable epoxy resins useful as component (a) are disclosed in, for example, U.S. Pat. Nos. 3,018,262; 7,163, 973; 6,887,574; 6,632,893; 6,242,083; 7,037,958; 6,572,971; 6,153,719; and 5,405,688; PCT Publication WO 2006/052727; U.S. Patent Application Publication Nos. 20060293172 and 20050171237, each of which is hereby incorporated herein by reference.

In some embodiments, the epoxy resin mixture may be present in the curable composition in an amount ranging from about 10 weight percent (wt %) to about 90 wt % of the curable composition, based on the total weight of the epoxy resin mixture, the cycloaliphatic anhydride hardener, the toughening agent and the catalyst. In other embodiments, the epoxy composition may range from about 15 wt % to about 85 wt % of the curable composition; from about 20 wt % to about 80 wt % in other embodiments; from about 25 wt % to about 75 wt % in other embodiments; from about 30 wt % to about 65 wt % in other embodiments; and from about 30 wt % to about 60 wt % in yet other embodiments, where the above weight percentages are based on the total weight of the epoxy resin mixture, the cycloaliphatic anhydride hardener, the toughening agent, and the catalyst.

The curing agent (also referred to as a hardener or crosslinking agent), component (b), useful for the curable epoxy resin composition of the present invention, may comprise cylcoaliphatic and/or aromatic anhydrides; and mixtures thereof. Cycloaliphatic anhydride hardeners may include, for example, nadic methyl anhydride, hexahydrophthalic anhydride, tetrahydrophthalic anhydride, methyl tetrahydrophthalic anhydride, methyl hexahydrophthalic anhydride and their derivatives; and mixtures thereof. Aromatic anhydrides may include, for example, phthalic anhydride, trimellitc anhydride and mixtures thereof. Anhydride curing agent may also include copolymers of styrene and maleic anhydride and other anhydrides described, for example, in U.S. Pat. No. 6,613,839, incorporated herein by reference.

In addition to the anhydride hardeners described above, additional hardeners or curing agents may also be provided in the curable composition for promoting crosslinking of the epoxy resin composition to form a polymer composition. As with the epoxy resins, the additional hardeners and curing agents may be used individually or as a mixture of two or more curing agents. The curing agent component may include any compound having an active group being reactive with the epoxy group of the epoxy resin. The curing agents may include nitrogen-containing compounds such as amines and their derivatives; oxygen-containing compounds such as carboxylic acid terminated polyesters, phenol novolacs, bisphenol-A novolacs, DCPD-phenol condensation products, brominated phenolic oligomers, amino-formaldehyde condensation products, phenol, bisphenol A and cresol novolacs, phenolic-terminated epoxy resins; sulfur-containing compounds such as polysulfides, polymercaptans; and mixtures thereof.

Examples of curing agents useful in the present invention may include any catalytic curing materials known to be useful for curing epoxy resin based compositions. Suitable catalytic curing agents include tertiary amine, quaternary ammonium halide, Lewis acids such as boron trifluoride, and any combination thereof or the like.

In some embodiments, the cycloaliphatic anhydride hardener or a mixture of cycloaliphatic anhydride hardeners may be present in the curable composition in an amount ranging from about 10 wt % to about 90 wt % of the curable composition, based on the total weight of the epoxy resin mixture, the cycloaliphatic anhydride hardener, the toughening agent and the catalyst. In other embodiments, the cycloaliphatic anhydride hardener may generally range from about 15 wt % to about 85 wt % of the curable composition; preferably from about 20 wt % to about 80 wt % in other embodiments; more preferably from about 25 wt % to about 75 wt % in other embodiments; even more preferably from about 30 wt % to about 65 wt % in other embodiments; and most preferably from about 35 wt % to about 60 wt % in yet other embodiments, wherein the above weight percentages are based on the total weight of the epoxy resin mixture, the cycloaliphatic anhydride hardener, the toughening agent and the catalyst.

The epoxy resin composition of the present invention includes toughening agent comprising a high molecular weight polyol such as for example poly(propylene oxide polyol for toughening the epoxy resin composition (such as an epoxy-anhydride system) without compromising some of the mechanical and thermal properties of the thermoset such as glass transition temperature. Examples of poly(propylene oxide polyols useful in the present invention may include the polyols having the following chemical structure:

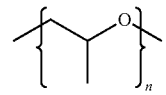

In general, the toughening agent useful in the present invention has a number average molecular weight of from greater than about 7,000 (n about 120) to about 20,000 (n about 345), preferably from about 8,000 (n about 138) to about 16,000 (n about 276), and more preferably from about 8,000 (n about 138) to about 15,000 (n about 259). The molecular weight of the toughening agent should be such that the final composition has a balance of properties, such as for example, wherein the final thermoset product exhibits an enhanced fracture toughness without sacrificing the Tg of the final thermoset product.

In some embodiments, a toughening agent may be present in the curable composition in an amount ranging from about 0.1 wt % to about 50 wt %. In other embodiments, the toughening agent may be present in an amount ranging from about 0.2 wt % to about 40 wt %; from about 0.5 wt % to about 30 wt % in other embodiments; and from about 1 wt % to about 25 wt % in yet other embodiments, wherein the above ranges are based on the total weight of the epoxy resin mixture, the cycloaliphatic anhydride hardener, the toughening agent and the catalyst.

In one illustration of the epoxy resin composition of the present invention, the composition may include optional components such as an optional catalyst to promote the epoxy-curing agent reaction, especially for example, when an anhydride curing agent is used. The catalyst useful in the present invention may include for example, at least one tertiary amine; at least one imidazole; at least one quaternary ammonium salt; or at least one, chromium complex, or a combination thereof.

In some embodiments, a catalyst may be present in the curable composition in an amount ranging from 0 wt % to about 10 wt % or from about 0.01 wt % to about 10 wt % in other embodiments. In other embodiments, the catalyst may be present in an amount ranging from about 0.1 wt % to about 8 wt %; from about 0.5 wt % to about 6 wt % in other embodiments; and from about 1 wt % to about 4 wt % in yet other embodiments, wherein the above ranges are based on the total weight of the epoxy resin mixture, the cycloaliphatic anhydride hardener, the toughening agent and the catalyst. The reaction of epoxy and anhydride curing agent may be slow or may not occur outside the above concentration ranges of the catalyst.

In one embodiment of the epoxy resin composition of the present invention, the composition may include optionally a non-reactive diluent. The non-reactive diluent useful in the present invention may include for example, In general, the composition may include from 0 wt % to about 10 wt % of the non-reactive diluent. In other embodiments, the composition may include from about 0.1 wt % to about 8 wt % non-reactive diluent; from about 0.5 wt % to about 8 wt % non-reactive diluent in other embodiments; and from about 1 wt % to about 8 wt % non-reactive diluent in other embodiments.

The curable or thermosettable composition of the present invention may optionally contain one or more other additives which are useful for their intended uses. For example, the optional additives useful in the present invention composition may include, but not limited to, stabilizers, surfactants, flow modifiers, pigments or dyes, matting agents, degassing agents, flame retardants (e.g., inorganic flame retardants, halogenated flame retardants, and non-halogenated flame retardants such as phosphorus-containing materials), toughening agents, curing initiators, curing inhibitors, wetting agents, colorants or pigments, thermoplastics, processing aids, UV blocking compounds, fluorescent compounds, UV stabilizers, inert fillers, fibrous reinforcements, antioxidants, impact modifiers including thermoplastic particles, and mixtures thereof. The above list is intended to be exemplary and not limiting. The preferred additives for the, formulation of the present invention may be optimized by the skilled artisan.

Curable compositions may also include from 0 wt % to about 50 wt % optional additives in some embodiments; and from about 0.1 wt % to about 50 wt % optional additives in other embodiments based on the total weight of the curable composition. In other embodiments, curable compositions may include from about 0.1 wt % to about 5 wt % optional additives; and from about 0.5 wt % to about 2.5 wt % optional additives in yet other embodiments.

The preparation of the curable epoxy resin composition of the present invention is achieved by admixing the reaction components above. For example, the epoxy resin, the curing agent, the polyol toughening agent, and optionally a catalyst, may be added to a reaction vessel; and then allowing the components to formulate into an epoxy resin composition. While there is no criticality to the order of mixture, i.e., the components of the formulation or composition of the present invention may be admixed in any order to provide the thermosettable composition of the present invention, in a preferred embodiment, the polyol may be added into the anhydride curing agent or into the epoxy resin-anhydride curing formulation.

Any of the above-mentioned optional assorted formulation additives, for example fillers, may also be added to the composition during the mixing or prior to the mixing to form the composition.

All the components of the epoxy resin composition are typically mixed and dispersed at a temperature enabling the preparation of an effective epoxy resin composition having a low viscosity for the desired application. The temperature during the mixing of all components may be generally from about 0° C. to about 100° C. and preferably from about 20° C. to about 50° C.

Curable compositions may be formed by combining (1) an aromatic epoxy resin or a cycloaliphatic epoxy resin or a mixture of (a) a cycloaliphatic epoxy resin, (b) an aromatic epoxy resin cycloaliphatic resin, an epoxy phenolic novolac resin, an epoxy bisphenol A novolac resin, a multifunctional epoxy resin, a bisphenol-A or bisphenol F based epoxy resin, with (2) a cycloaliphatic anhydride hardener, (3) toughening agent, and (4) optionally a catalyst. Additional hardeners, epoxy resins, catalysts, toughening agents and other additives may also be added, as described above. The relative proportions of the epoxy resin mixtures and the cycloaliphatic anhydride hardener may depend, in part, upon the properties desired in the curable composition or thermoset compositions to be produced, the desired cure response of the composition, and the desired pot life of the composition. "Potlife" herein means the time it takes to increase the viscosity to double or triple the initial viscosity of the formulation at application temperature.

The viscosity of the epoxy resin composition prepared by the process of the present invention ranges generally from about 0.1 Pa-s to about 15,000 Pa-s at 25° C.

The curable epoxy resin formulation or composition of the present invention can be cured under conventional processing conditions to form a thermoset. The resulting thermoset displays excellent thermo-mechanical properties, such as good toughness and mechanical strength, while maintaining high thermal stability.

The process to produce the thermoset products of the present invention may be performed by gravity casting, vacuum casting, automatic pressure gelation (APG), vacuum pressure gelation (VPG), infusion, filament winding, lay up injection, transfer molding, prepreging, dipping, coating, spraying, brushing, and the like.

The curing reaction conditions include, for example, carrying out the reaction under a temperature, generally in the range of from about 0° C. to about 300° C.; preferably, from about 20° C. to about 250° C.; and more preferably, from about 50° C. to about 200° C.

The pressure of the curing reaction may be carried out, for example, at a pressure of from about 0.01 bar to about 1000 bar; preferably, from about 0.1 bar to about bar 100; and more preferably, from about 0.5 bar to about 10 bar.

The curing of the curable or thermosettable composition may be carried out, for example, for a predetermined period of time sufficient to cure the composition. For example, the curing time may be chosen between about 1 minute to about 24 hours, preferably between about 10 minutes to about 12 hours, and more preferably between about 100 minutes to about 8 hours.

The curing process of the present invention may be a batch or a continuous process. The reactor used in the process may be any reactor and ancillary equipment well known to those skilled in the art.

In one embodiment, the curable compositions described above may be disposed on a substrate and cured. The substrate is not subject to particular limitation. As such, substrates may include metals, such as stainless steel, iron, steel, copper, zinc, tin, aluminum, alumite and the like; alloys of such metals, and sheets which are plated with such metals and laminated sheets of such metals. Substrates may also include polymers, glass, and various fibers, such as, for example, carbon/graphite; boron; quartz; aluminum oxide; glass such as E glass, S glass, S-2 GLASS® or C glass; and silicon carbide or silicon carbide fibers containing titanium. Commercially available fibers may include: organic fibers, such as KEVLAR® from DuPont; aluminum oxide-containing fibers, such as NEXTEL® fibers from 3M; silicon carbide fibers, such as NICALON® from Nippon Carbon; and silicon carbide fibers containing titanium, such as TYRRANO® from Ube. In particular embodiments, the curable compositions may be used to form at least a portion of a circuit board or a printed circuit board. In some embodiments, the substrate may be coated with a compatibilizer to improve the adhesion of the curable or cured composition to the substrate.

The cured or thermoset product prepared by curing the epoxy resin composition of the present invention advantageously exhibits an improved balance of processability and thermo-mechanical properties (e.g. pre-cured formulation viscosity, glass transition temperature, modulus, and toughness). The cured product can be visually transparent or opalescent. Compared to analogous thermosets prepared using only conventional epoxy resins, the thermosets prepared using the epoxy resins of the present invention have increase in fracture toughness without sacrificing the final Tg of the resulting thermoset.

The Tg of the thermoset product will depend on the curing agent and the epoxy resin used in the curable composition. Generally, the Tg of the cured epoxy resins of the present invention may be from about 100° C. to about 300° C.; and more preferably from about 100° C. to about 265° C.

Similarly, the fracture toughness of the thermoset product will depend on the curing agent and the epoxy resin used in the curable composition. Generally, the fracture toughness of the cured epoxy resins of the present invention may be from about 0.4 MPa/m$^{1/2}$ to about 3 MPa/m$^{1/2}$; and more preferably from about 0.6 MPa/m$^{1/2}$ to about 2 MPa/m$^{1/2}$.

The epoxy resin compositions of the present invention are useful for the preparation of epoxy thermosets or cured products in the form of coatings, films, adhesives, laminates, composites (e.g., filament winding, pultrusion), electronics, and the like. In some embodiments, pultrusion, filament winding, casting, or vacuum infusion is generally preferred.

As an illustration of the present invention, in general, the epoxy resin compositions may be useful for casting, potting, encapsulation, molding, and tooling. The present invention is particularly suitable for all types of electrical casting, potting, and encapsulation applications; for molding and plastic tooling; and for the fabrication of epoxy based composites parts, particularly for producing large epoxy-based parts produced by casting, potting and encapsulation. The resulting composite material may be useful in some applications, such as electrical casting applications or electronic encapsulations, castings, moldings, potting, encapsulations, injection, resin transfer moldings, composites, coatings and the like.

EXAMPLES

The following examples and comparative examples further illustrate the present invention in detail but are not to be construed to limit the scope thereof.

Various terms and designations used in the Examples include the following: "TA" stands for toughening agent; SD-1731 is a high purity phenol-formaldehyde novolac obtained from Hexion; DL-50 is an aromatic amine curing agent obtained from Air Products; DER 383 is an epoxy resin having an EEW of 180 and commercially available from The Dow Chemical Company; "MTHPA" stands for methyl tetrahydrophthalic anhydride and was obtained from Dixie Chemical sold under the name ECA 100; Acclaim 8200 is a polypropylene oxide homopolymer commercially available from Bayer; "NMA" stands for nadic methyl anhydride and was obtained from Dixie Chemical Company; SYNA EPDXY 21 is 3,4 epoxy cyclohexyl methyl-3,4-epoxy cyclohexane carboxylate, having an EEW of 140, and obtained from Synasia; Voranol 4000 is a poly(propylene oxide) of molecular weight 4000 commercially available from Dow; 2-ethyl 4-methyl imidazole was purchased from Aldrich Chemical; "DMTA" stands for differential mechanical thermal analysis; and "ARES" stands for advanced rheometric expansion system.

In the Examples which follow, the Tg of the cured product was measured by DMTA. DMTA was performed using an ARES solid-state analyzer. Rectangular samples roughly 2.5"×0.5"×0.125" were inserted into the solid state fixtures and subjected to an oscillatory torsional load. The shear storage modulus G', shear loss modulus G" and tan delta (G"/G') were recorded. An angular frequency of 1 Hz was used. Samples were subjected to a dynamic temperature ramp from room temperature (about 28° C.) to 300° C. at 3° C./minute.

Fracture toughness of the cured product was measured using the compact tension sample geometry in accordance with ASTM D-5045.

Example 1

DER 383 (49.42 g), MTHPA (45.48 g), Acclaim 8200 (5 g) were taken in a 250 mL R.B. flask and mixed together at 70° C. to get a homogeneous mixture. The catalyst (2-ethyl-4-methyl imidazole, 1 g) was added and stirred well for 3 minutes. The solution was degassed by centrifugation, poured into the mold and cured at elevated temperature in an oven. The curing profile used was 90° C. for 2 hours, 150° C. for 4 hours, followed by cooling to room temperature (about 25° C.).

The Tg of the resulting cured product (thermoset) was 138° C. and the fracture toughness of the cured product was 1.2 MPa/m$^{1/2}$.

Example 2

NMA (52.5 g), Acclaim 8200 (30 g) were taken in a 250 mL round bottom flask and mixed together at 70° C. to get a homogeneous mixture. The catalyst (2-ethyl-4-methyl imidazole, 1.8 g) was added and stirred well for 3 minutes. To this, a blend of D.E.R. 383 and SYNA EPDXY 21 (30:70 ratio) was added and stirred well at room temperature (about 25° C.) to get a homogeneous solution. The solution was degassed by centrifugation, poured into the mold and cured at elevated temperature in an oven. The curing profile used was 90° C. for 2 hours, 150° C. for 2 hours, 200° C. for 2 hours, followed by cooling to room temperature.

The Tg of the resulting cured product (thermoset) was 232° C. and the fracture toughness of the cured product was 0.84 MPa/m$^{1/2}$.

Example 3

NMA (24.02 g), Acclaim 8200 polypropylene (7.5 g) were taken in a 250 mL round bottom flask and mixed together at 70° C. to get a homogeneous mixture. The catalyst (2-ethyl-4-methyl imidazole, 0.45 g) was added and stirred well for 3 minutes. To this SYNA EPDXY 21 (18.48 g) was added and stirred well at room temperature to get a homogeneous solution. The solution was degassed by centrifugation, poured into the mold and cured at elevated temperature in an oven. The curing profile used was 90° C. for 2 hours, 150° C. for 2 hours, 200° C. for 2 hours, followed by cooling to room temperature (about 25° C.).

The Tg of the resulting cured product (thermoset) was 259° C. and the fracture toughness of the cured product was 0.84 MPa/m$^{1/2}$.

Example 4

D.E.R. 383 (57 g, 0.314 equivalents), SD-1731 (33 g, 0.314 equivalents) and 75 g acetone are added to a 500 mL round bottom flask. The mixture is stirred well to get a homogeneous solution. Acetone is removed by rotovap, Acclaim 8200 (10 g) and the catalyst (1 wt % 2-ethyl 4 methyl imidazole) are added to the solution and stirred for 5 minutes to get a homogeneous viscous liquid. The viscous liquid is then poured into a mold and cured at elevated temperature in an oven. The curing profile used is 90° C. for 2 hours, 150° C. for 4 hours, followed by cooling to room temperature (about 25° C.).

Example 5

D.E.R. 383 (48.6 g,) and DL-50 (13.65 g, 0.267 equivalents) are added to an 8 oz glass bottle and mixed well to get a homogeneous clear liquid. Acclaim 8200 (5 g) is added into the mixture in the bottle and mixed well. The resultant clear solution is degassed by centrifugation, poured into a mold and cured in an oven with the following curing schedule: 80° C. (for 2 hours) followed by 150° C. (for 3 hours).

Comparative Examples A

The same procedure of Example 1 above was used in this Comparative Example A with Voranol 4000 used as the toughening agent instead of Acclaim 8200. The Tg of the resulting cured product was 133° C. and the fracture toughness of the cured product was 1.3 MPa/m$^{1/2}$.

Comparative Examples B

The same procedure of Example 1 above was used in this Comparative Example B except that no toughening agent was used. The Tg of the resulting cured product was 137° C. and the fracture toughness of the cured product was 0.5 MPa/m$^{1/2}$.

Comparative Examples C

The same procedure of Example 2 above was used in this Comparative Example C except that no toughening agent was used. The Tg of the resulting cured product was 232° C. and the fracture toughness of the cured product was 0.4 MPa/m$^{1/2}$.

Comparative Examples D

The same procedure of Example 3 above was used in this Comparative Example D except that no toughening agent was used. The Tg of the resulting cured product was 244° C. and the cured product was extremely brittle.

Table I below summarizes the advantages of using a high molecular weight poly(propylene oxide) polyol of the present invention in different epoxy-anhydride systems.

TABLE I

| EXAMPLE | SYSTEM COMPONENTS | TOUGHENING AGENT (TA) | CHEMICAL COMPONENT | Tg (DMTA) ° C. | TOUGHNESS (K1c) (MPa/m$^{1/2}$) | MOLECULAR WEIGHT of TA |
|---|---|---|---|---|---|---|
| Example 1 | DER 383/MTHPA 5% TA | ACCLAIM 8200 | High molecular weight poly(propylene oxide) polyol | 145 | 1.2 | 8000 |
| Comparative A | DER 383/MTHPA 5% TA | VORANOL 4000 | Low molecular weight poly(propylene oxide) polyol | 133 | 1.3 | 4000 |
| Comparative B | DER 383/MTHPA [No TA added] | CONTROL | [No TA present] | 146 | 0.5 | |
| Example 2 | SYNA EPOXY 21/DER 383/NMA 15% TA | ACCLAIM 8200 | High molecular weight poly(propylene oxide) polyol | 235 | 0.84 | |
| Comparative C | SYNA EPOXY 21/DEN 438/DER 383/NMA [No TA added] | CONTROL | [No TA present] | 232 | 0.4 | |
| Example 3 | SYNA EPOXY 21/NMA 15% TA | ACCLAIM 8200 | High molecular weight poly(propylene oxide) polyol | 259 | 0.84 | |
| Comparative D | SYNA EPOXY 21/NMA [No TA added] | CONTROL | [No TA present] | 244 | very brittle | |

What is claimed is:

1. A curable epoxy resin composition comprising (a) a liquid epoxy resin; (b) at least one curing agent selected from the group consisting of at least one anhydride; at least one phenolic novolac; at least one amine; or a mixture thereof; and (c) at least one high molecular weight poly(propylene oxide) polyol having the following chemical structure:

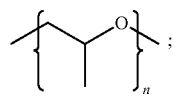

wherein the number average molecular weight of the poly(propylene oxide) polyol is about 7,000 to about 20,000 with n being from about 120 to about 345.

2. The composition of claim 1, wherein the number average molecular weight of the poly(propylene oxide) polyol is from about 7,000 to about 16,000 with n being from about 120 to about 275.

3. The composition of claim 1, wherein the final cured product has a Tg of from about 70° C. to about 265° C.

4. The composition of claim 1, wherein the liquid epoxy resin comprises a cycloaliphatic resin.

5. The composition of claim 1, wherein the liquid epoxy resin comprises an epoxy resin novolac.

6. The composition of claim 1, wherein the polyol comprises a high molecular weight polypropylene oxide) diol, a high molecular weight poly(polypropylene oxide) triol, or tetra-olor mixtures thereof.

7. The composition of claim 1, including a catalyst or an accelerator.

8. The composition of claim 7, wherein the catalyst comprises at least one tertiary amine; at least one imidazole; at least one quaternary ammonium salt; at least one chromium complex; a triphenyl phosphine; or mixtures thereof.

9. The composition of claim 1, wherein the concentration of the epoxy resin comprises from about 30 weight percent to about 90 weight percent.

10. The composition of claim 1, wherein the concentration of the curing agent comprises from about 10 weight percent to about 70 weight percent.

11. The composition of claim 1, wherein the concentration of the poly(propylene oxide) polyol comprises from about 1 weight percent to about 25 weight percent.

12. A cured article prepared by curing the composition of claim 1.

13. A composite prepared by curing the composition of claim 1 on a substrate to prepare the composite.

14. A process for preparing a curable epoxy resin composition comprising admixing (a) a liquid epoxy resin; (b) at least one curing agent selected from the group consisting of at least one anhydride; at least one phenolic novolac; at least one amine; or a mixture thereof; and (c) at least one high molecular weight polyol having the following chemical structure:

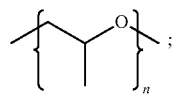

wherein the number average molecular weight of the poly(propylene oxide) polyol is from about 7,000 to about 20,000 with n being from about 120 to about 345.

15. A process for preparing a composite comprising (I) admixing (a) a liquid epoxy resin; (b) at least one curing agent selected from the group consisting of at least one anhydride; at least one phenolic novolac; at least one amine; or a mixture thereof; and (c) at least one high molecular weight polyol having the following chemical structure:

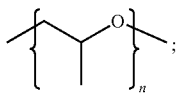

wherein the number average molecular weight of the poly(propylene oxide) polyol is about 7,000 to about 20,000 with n being from about 120 to about 345; and (II) curing the composition from the above step (I) on a substrate to prepare the composite.

* * * * *